US008197679B2

(12) United States Patent
Ashworth

(10) Patent No.: US 8,197,679 B2
(45) Date of Patent: Jun. 12, 2012

(54) PARTICLE SEPARATION ASSEMBLY

(75) Inventor: Terence Ives Ashworth, British Channel Islands (GB)

(73) Assignee: Vapormatt Limited, Guernsey, British Channel Islands (GB)

( * ) Notice: Subject to any disclaimer, the term of this patent is extended or adjusted under 35 U.S.C. 154(b) by 588 days.

(21) Appl. No.: 12/333,111

(22) Filed: Dec. 11, 2008

(65) Prior Publication Data

US 2009/0139919 A1 Jun. 4, 2009

(30) Foreign Application Priority Data

Dec. 11, 2007 (EP) .................................... 07254778

(51) Int. Cl.
*B01D 21/00* (2006.01)

(52) U.S. Cl. ......... 210/97; 55/467; 210/323.2; 210/519; 210/522; 210/532.1; 210/533; 210/540; 209/157; 209/208

(58) Field of Classification Search .................. 210/519, 210/521, 522, 533–535, 97, 323.2, 532.1, 210/538, 540; 209/157, 158, 208, 210; 451/446; 55/418, 440, 467
See application file for complete search history.

(56) References Cited

U.S. PATENT DOCUMENTS

| | | | | |
|---|---|---|---|---|
| 1,916,035 | A * | 6/1933 | Berguerand | 209/208 |
| 2,613,811 | A * | 10/1952 | Archibald | 210/110 |
| 2,673,451 | A * | 3/1954 | Gariel | 210/154 |
| 3,240,336 | A * | 3/1966 | Condolios | 209/157 |
| 3,438,502 | A * | 4/1969 | Borre et al. | 210/232 |
| 3,666,112 | A * | 5/1972 | Pielkenrood et al. | 210/521 |
| 4,525,274 | A * | 6/1985 | Willus et al. | 210/232 |
| 6,921,489 | B2 * | 7/2005 | Albertson | 210/802 |

FOREIGN PATENT DOCUMENTS

| | | |
|---|---|---|
| GB | 2352656 A | 2/2001 |
| WO | WO 93/19851 | 10/1993 |

OTHER PUBLICATIONS

European Search Report, mailed May 9, 2008, for corresponding European Patent Application No. EP 07254778.9.

* cited by examiner

*Primary Examiner* — Joseph Drodge
(74) *Attorney, Agent, or Firm* — Klarquist Sparkman, LLP

(57) ABSTRACT

A particle separation assembly comprises a vessel provided with an inlet, a first outlet and a second outlet. The assembly is arranged such that the flow rate of fluid through the inlet is greater than the flow rate of fluid through the first outlet such that there is a resultant fluid flow of lighter particles up the vessel and through the second outlet. Flow adjustment means are provided to enable the velocity of this resultant fluid flow to be adjusted, said means comprising a pivotable flap in one example.

21 Claims, 3 Drawing Sheets

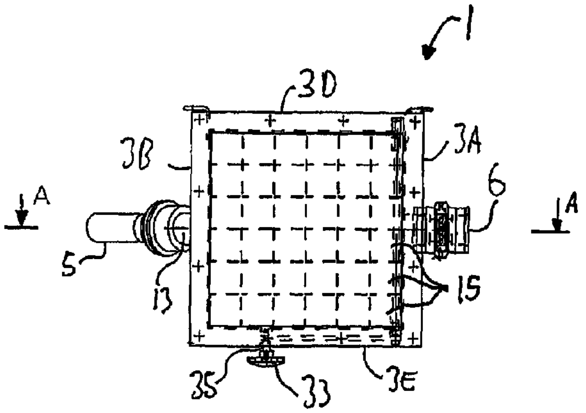
FIGURE 1
FIGURE 3
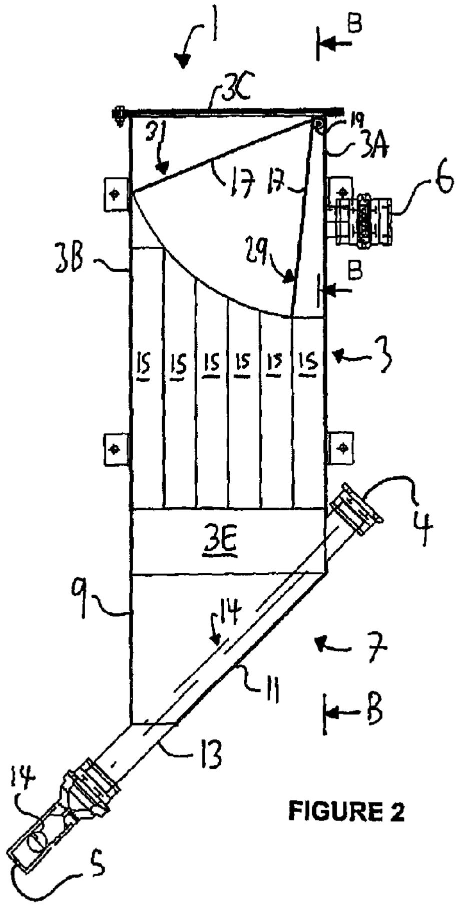
FIGURE 2
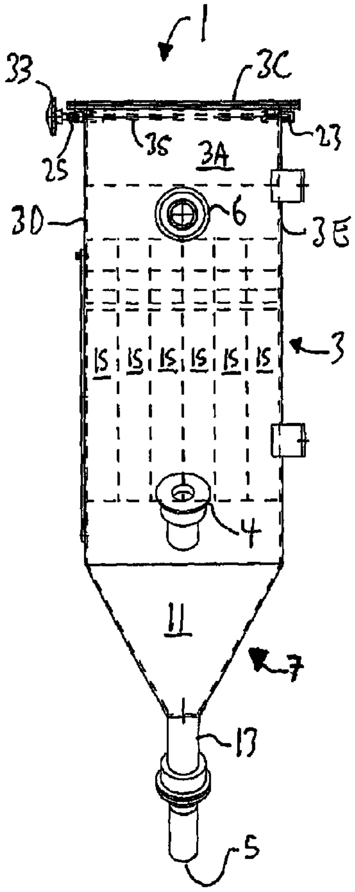

PARTICLE SEPARATION ASSEMBLY

The present invention relates to a particle separation assembly and particularly but not exclusively relates to a particle separation assembly for use with abrasive blasting apparatus.

UK patent 2352656 B (application number 0017005.0) describes a particle separation assembly comprising a vessel provided with an inlet, a first outlet at the lower end of the vessel and a second outlet at the upper end of the vessel. The assembly is configured such that in use, when a fluid carrying particles is pumped through the inlet into the vessel and the flow rate of the fluid through the inlet is greater than the flow rate of fluid through the first outlet, the difference in flow rates gives rise to a resultant fluid flow which acts to convey a substantial proportion of particles below a predetermined mass to the second outlet. Thus, where the fluid carrying particles comprises particles of substantially the same density then those particles below the predetermined mass will generally be of a smaller size than those particles above the predetermined mass, and the smaller particles are therefore conveyed upwards to the second outlet. The generally larger particles sink to the first outlet.

This invention has resulted from some development work made on the original assembly as described above.

According to a first aspect of the invention there is provided a particle separation assembly comprising a vessel, the vessel being provided with an inlet, a first outlet and a second outlet, the assembly being so arranged that in use when a fluid carrying particles is pumped through the inlet into the vessel and the flow rate of fluid through the inlet is greater than the flow rate of fluid through the first outlet, the difference in flow rates gives rise to a resultant fluid flow which acts to convey a substantial proportion of particles below a predetermined mass to the second outlet, characterised in that the particle separation assembly comprises flow adjustment means operative to adjust the velocity of the resultant fluid flow through the vessel.

Preferably at least one tube is provided within the vessel to convey the resultant fluid flow through the vessel to the second outlet.

Preferably a plurality of tubes are provided.

Preferably the plurality of tubes are provided so as to extend across the vessel.

Preferably the tubes are arranged in a plurality of rows.

Preferably a tube nearest the second outlet is a different length to a tube distal from the second outlet.

Preferably the tube nearest the second outlet is shorter than the tube distal from the second outlet.

Preferably the tubes are arranged to be of incrementally increasing length with the tube or tubes distal from the second outlet being longer than the tube or tubes adjacent the second outlet.

Preferably the flow rate adjustment means comprises means to vary the cross sectional area of the tube or tubes that is/are in fluid communication with the second outlet.

Preferably the means to vary the cross sectional area of the tube or tubes is operative to close the tube or tubes so as to prevent flow of fluid through the closed tube or tubes.

Preferably the means to vary the cross sectional area of the tube or tubes is operative to close the tube or tubes by varying the liquid level within the vessel, that is by varying the number of tubes that are below the liquid level and which are therefore in fluid communication with the second outlet.

Preferably the means to vary the cross sectional area of the tube or tubes is operative to vary the liquid level within the tube or tubes by varying the air pressure in the vessel such that increasing the air pressure serves to reduce the liquid level to reduce the number of tubes that are below the liquid level and which are therefore in fluid communication with the second outlet.

The flow adjustment means may alternatively comprise a plate movable between a first position in which the plate reduces the cross sectional area of a tube that is fluid communication with the second outlet, and a second position in which the plate increases the cross sectional area of the tube.

Thus, as the cross sectional area of a tube increases, the velocity of the fluid flowing through the tube decreases, although the volume flow rate preferably remains the same.

Preferably the plate is movable between a first position in which the plate closes a tube such that that tube is not in fluid communication with the second outlet, and a second position in which the plate opens the tube.

Preferably the plate is movable to at least one position intermediate the first and second positions.

Preferably the plate is movable between a plurality of positions intermediate the first and second positions.

Preferably the plate is movable to a position in which the plate sealingly closes an entire row of tubes.

Preferably locking means are provided to lock the plate in a desired position.

Preferably the plate comprises a flap pivotally mounted on the vessel.

The or each tube may be of quadrilateral transverse cross section. The or each tube may alternatively be of any other desired cross section including circular.

The tubes may be arranged in a honeycomb formation.

Preferably the inlet and the first outlet are provided on opposed ends of a conduit mounted on the vessel.

Preferably the conduit is inclined relative to the longitudinal axis of the vessel.

Preferably a part of the conduit intermediate the inlet and first outlet is provided with means to enable fluid communication between the conduit and the interior of the vessel.

Preferably the means to enable fluid communication comprise at least one flow aperture.

Preferably the means to enable fluid communication comprises a plurality of flow apertures.

According to a second aspect of the invention there is provided abrasive blasting apparatus comprising the particle separation assembly of the first aspect of the invention.

Other aspects of the present invention may include any combination of the features or limitations referred to herein.

The present invention may be carried into practice in various ways, but embodiments will now be described by way of example only with reference to the accompanying drawings in which:

FIG. 1 is a plan view of a particle separation assembly in accordance with the present invention;

FIG. 2 is a sectional front view of the assembly taken on line A-A of FIG. 1 and showing an adjustable part of the assembly in a plurality of different positions;

FIG. 3 is a sectional side view of the assembly of FIG. 1 with parts of the assembly shown in phantom;

Figure 4:
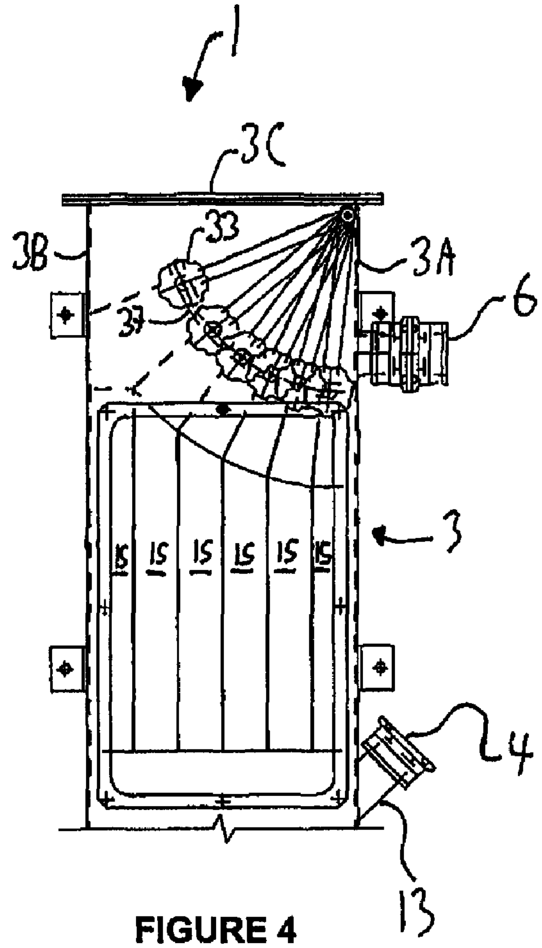
FIG. 4 is a front view of the assembly of FIG. 1 with the lower part of the assembly removed for clarity, and showing an adjustable part of the assembly in a plurality of different positions.
Figure 5:
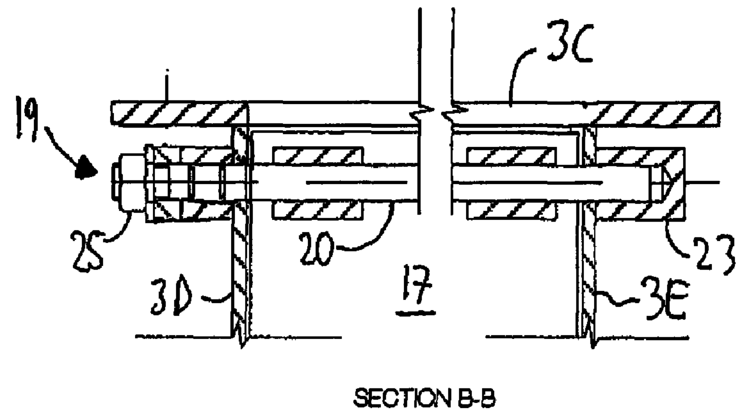
FIG. 5 is a view on section B-B of FIG. 2.

Referring to the Figures, a particle separation assembly 1 comprises a vessel 3 provided with an inlet 4, a first outlet 5 and a second outlet 6. The inlet 4, the first outlet 5 and the second outlet 6 may each be valved and/or may comprise calibrated orifices being such that the flow rate of fluid through the inlet 4 and/or outlet 5 and/or second outlet 6 is calibrated on manufacture of the assembly 1.

The vessel 3 comprises a main body of generally cuboid shape having a substantially square transverse cross section, when viewed in plan. The top of the vessel 3 is sealed closed with a lid 3C.

A lowermost portion 7 of the vessel 3 has one straight side 9 and an opposite, inwardly tapered side 11 such that the lowermost portion 7 is funnel shaped.

The inlet 4 and the first outlet 5 are located at opposite ends of an inclined cylindrical conduit 13 that is positioned in the lowermost portion 7 of the vessel 3. The part 14 of the conduit 13 intermediate the inlet 4 and first outlet 5 is located against the tapered side 11 on the lowermost portion 7 of the vessel 3 and comprises means to enable fluid communication between the conduit 13 and the inside of the vessel 3. The means to enable fluid communication may be provided by the top half of the intermediate part 14 of the conduit 13 being fully or partially cut away, or may be provided by a flow aperture or apertures (not shown) formed in the top half of the intermediate part 14 of the conduit.

The inlet 4 is thus positioned adjacent a first side 3A of the vessel 3 just above the top of the lowermost portion 7. The first outlet 5 protrudes below the bottom, and past an opposed side 3B of, the vessel 3. The first outlet 5 is provided with an underflow deflector 14 in the form of a butterfly valve.

The second outlet 6 is positioned about three quarters of the way up the first side 3A of the vessel 3 and comprises a tubular union sealingly mounted on a boss formed on the side 3A of the vessel 3.

The inside of the vessel 3 is divided into a plurality of separator tubes 15 each being of substantially square transverse cross section when viewed in plan. The tubes 15 are arranged, in this example, in six rows of six tubes 15.

The lower end of each tube 15 opens onto the lowermost portion 7 of the vessel 3, above the intermediate part 14 of the conduit 13.

The upper end of each tube 15 is positioned below the second outlet 6. The tubes 15 are of varying lengths such that the tubes 15 in the rows distal from the second outlet 6 (ie adjacent vessel side 3B) extend further up the vessel 3 than the tubes 15 in the rows adjacent the second outlet 6 (ie adjacent vessel side 3A). The upper margins of adjacent tubes 15 are contiguous when viewed from the side such that the upper margins of the tubes 15 in adjacent rows define a smooth, constant radius arc from one side 3B of the vessel 3 to the other side 3A.

Flow adjustment means is provided in the form of a plate flap 17 that is pivotably mounted 19, by way of a shaft 20, at the side 3A of the vessel 3 from which the second outlet 6 protrudes. The shaft 20 protrudes through the front and rear walls 3D, 3E of the vessel 3 and is secured at one end with an end cap 23 and at the other end with a nut 25. Circlips and o-ring seals are provided on the shaft 20 to ensure that the shaft 20 is retained in position on the vessel 3 and that fluid cannot leak around the shaft 20.

The flap 17 is thus designed to pivot about the shaft 20 relative to the vessel 3 so that the margin 27 of the flap 17 distal from the shaft 20 sealing engages the top of the tubes 15, the degree of pivoting of the flap 17 determining which row of tubes 15 is sealed closed, ie which row of tubes 15 is not in fluid communication with the second outlet 6. Thus the flap 17 can be pivoted between a high flow rate position indicated by arrow 29 wherein only one row of tubes 15 is in communication with the second outlet 6, to a low flow-rate position indicated by arrow 31 wherein all of the rows of tubes 15 are in communication with the second outlet 6.

The flap 17 can be retained in a given position by way of a knurled knob 33 mounted on an axle 35 adjacent the lower margin of the flap 19. The axle 35 slides within, and is guided by, an arcuate slot formed in a positioning bar 37 welded to the vessel 3. The knob 33 can be screwed onto the axle 35 so as to clamp the flap 17 onto the positioning bar 37, ie such that the positioning bar 37 is clamped between the side margin of the flap 17 and the knob 33.

In use of the assembly 1, a fluid carrying particles having a range of sizes is pumped through the inlet 4 and into the conduit 13. All the particles entering the vessel 3 are typically of substantially the same density.

The first outlet 5 is arranged so as to reduce the flow speed inside the conduit 13 relative to the flow speed at which the fluid is pumped into the conduit 13 through the inlet 4.

The first outlet 5 is thus configured (either through the use of a calibrated orifice during manufacture, or by way of a valve or the like post manufacture) so that the rate at which fluid enters the vessel 3 is greater than the rate at which fluid may leave the vessel 3 via the first outlet 5. The difference in the flow rate (measured as volume per unit time) between the inlet 4 and the first outlet 5 gives rise to a resultant fluid flow which acts to fill the lowermost portion 7 of the vessel 3 adjacent the conduit 13. The velocity of this resultant upward fluid flow is sufficient to convey only a proportion of the particles entering the vessel 3 up towards the second outlet 6 through the separator tubes 15, ie those particles below a certain predetermined mass. Given that the particles entering the vessel 3 are of substantially the same density then the size of particle is directly proportional to the mass of particle and thus the velocity of the upward flow will be sufficient to carry only those particles below a certain size along the tubes 15.

Hence a substantial proportion of the smaller particles (fines) are conveyed to the second outlet 6 via the tubes 15 and the heavier larger particles (abrasives) and a proportion of fines descend down along the conduit 13 and through the first outlet 5.

The velocity of smaller particles and fluid up through the tubes 15 and through the second outlet 6 can be adjusted by varying the total transverse cross section of the tubes 15, that is in fluid communication with the second outlet 6. This adjustment is effected by pivoting the flap 17 so as to close, or partially close, or open the desired row or rows of tubes 15. For a given fluid volume flow rate through the inlet 4, the fluid velocity through the tubes 15 can be increased by closing off rows of tubes 15, that is by pivoting the flap 17 anticlockwise towards the second outlet 6 such that the effective cross sectional area of the tubes 15 is reduced, or decreased by pivoting the flap 17 clockwise away from the second outlet 6 so as to increase the total cross sectional area of the tubes 15 that is in communication with the second outlet 6.

Thus, in use of the assembly 1, the volume flow rate of fluid through the second outlet 6 remains constant irrespective of the position of the flap 17. The position of the flap 17 instead adjusts the velocity of fluid flowing up the tubes 15 and into the second outlet 6.

It is also to be noted that the ratio of the length to diameter of each tube 15 can be used to encourage streamlined fluid flow. In particular, in a preferred embodiment, the length of the tubes 15 in the shortest row of tubes 15 adjacent the vessel wall 3A having the second outlet 6 is approximately six times the diameter of the tubes 15.

It is also envisaged that the pressure of the fluid supplied to the vessel 3 could be varied in order to adjust or further adjust the velocity of the fluid flow through the tubes 15.

It is also envisaged that the speed of the pump pumping fluid through the inlet 4 could be adjusted.

We have also advantageously discovered that providing a cuboidal vessel 3 of quadrilateral, in this case square, transverse cross section is advantageous from an ease and cost of manufacturing point of view. This also applies to the tubes 15, although it is also envisaged that other shape cross section tubes could alternatively be used. In particular circular cross section tubes could be used and could be secured together, in a honeycomb formation, as a tube module prior to the tube module being mounted in the vessel 3.

Figure 6:
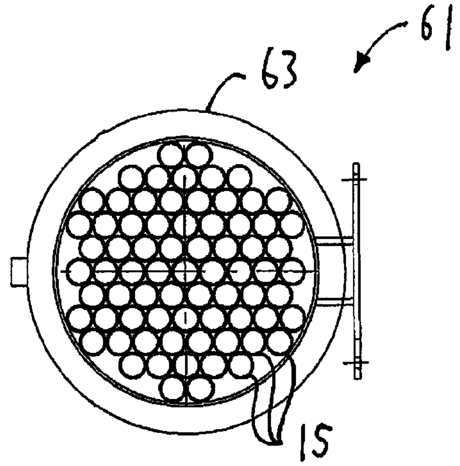
FIG. 6 is a plan view of a modified particle separation assembly in accordance with the present invention.
Figure 7:
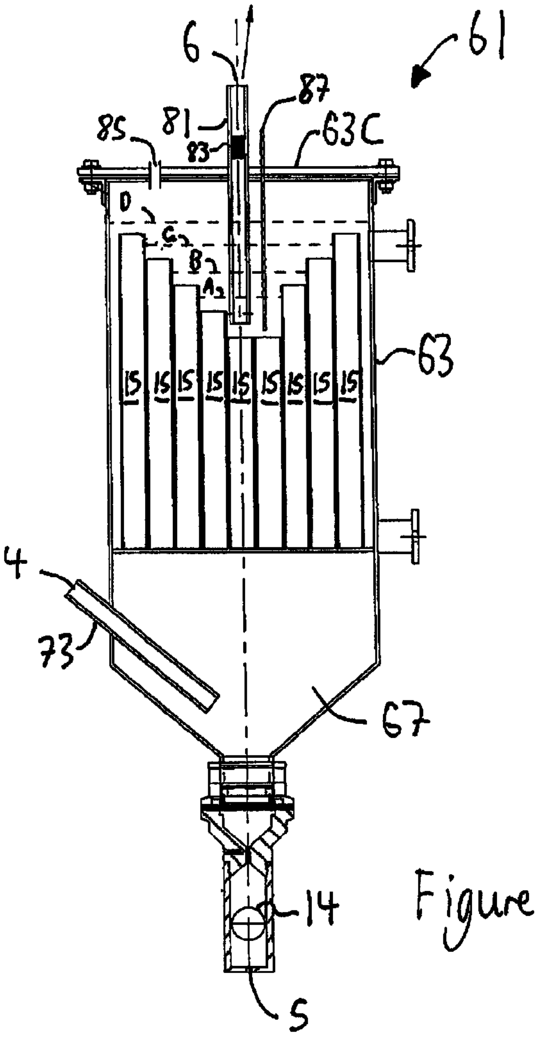
FIG. 7 is a sectional side view of the modified assembly of FIG. 6 with parts of the assembly shown in phantom.

Referring additionally to FIGS. 6 and 7, a modified particle separation assembly 61 comprises a vessel 63 of similar structure to the vessel 3 described above with like features being given like references.

The vessel 63 is of circular rather than quadrilateral transverse cross section, that is, when viewed in plan.

The lower part of the vessel 63 is provided with an inclined conduit 73 the upper end of which comprises a fluid inlet 4. In this example, the outlet 5 is provided at the base of the sump 67 of the vessel 63

The inside of vessel 63 is again divided into a plurality of separator tubes 15 which in this example are of circular transverse cross section.

The tubes 15 are arranged such that the lower ends of the tubes 15 are aligned and occupy the same horizontal plane, whereas the upper ends of the tubes 15 are not aligned and thus occupy different horizontal planes. The tubes 15 are thus of varying length with the shortest tubes 15 being adjacent the central vertical axis of the vessel 3 and the longest tubes 15 being adjacent the wall of the vessel 63, distal from the central vertical axis of the vessel 63. The length of the tubes 15, and their upper ends, thus increased incrementally from a position adjacent the vessel axis to a position distal the vessel axis.

In this example, the second outlet 6 is provided at the upper end of a vertical outlet conduit 81 that extends through the lid 63C of the vessel 63 and into the upper part of the vessel 63. The lower end of the outlet conduit 81 is spaced just above the upper end of the shortest separator tube 15 and just below the lowest level of liquid that is achieved during use.

An actuated valve 83 is provided in the outlet conduit 81 to enable the flow rate of the separated smaller particles through the conduit 81 to be controlled.

The vessel 63 further comprises a pressurised air inlet/exhaust aperture or valve 85 provided in the lid 63C. The inlet/exhaust 85 is connected to a source of pressurised air or gas (not shown) such that the pressurised air/gas can be pumped into, and exhausted from, the interior of the vessel.

A liquid level sender in the form, in this example, of a guided wave radar unit 87 is provided in the vessel 63 so as to generate a signal indicative of the level of liquid within the vessel 63, and thus the tube or tubes 15 that are below the liquid level. Various liquid levels are shown in phantom and are indicated A, B, C, D. The signal generated by the liquid level sender is used to control the pressurised air/gas source and/or the inlet/exhaust 85 so as to vary the pressure of the air within the vessel 63.

In use of the vessel 63, fluid enters the vessel 63 through the inlet 4 at a predetermined flow rate which is greater than the flow rate at which fluid may exit the vessel 63 through the first outlet 5. This difference in flow rate gives rise to a resultant fluid flow which acts to fill the vessel 63.

The flow of air/gas through the air inlet/exhaust 85 is simultaneously or subsequently adjusted so as to vary the air pressure within the vessel 63. The pressure of the air/gas above the liquid level can thus be varied so as to adjust the level the liquid reaches within the vessel 63. Increasing the air pressure forces the liquid level down and decreasing the air pressure has the opposite effect.

Thus the air/gas pressure within the vessel 63 is used to vary the liquid level so as to vary the number of tubes 15 that are exposed to the air/gas, and thus the number of tubes 15 that remain beneath the liquid level. The resultant fluid flow occurs only in the tube or tubes 15 that are in fluid communication with the outlet conduit 81, that is, the tube or tubes 15 beneath the liquid level. Flow through the other tubes 15 is resisted by the air/gas pressure to which those tubes 15 are exposed.

Thus, for example, when the liquid level is relatively low as indicated by level A, only the two radially innermost tubes 15 are beneath the liquid level A, that is, the tubes 15 adjacent the outlet conduit 81. The cross sectional area of the tubes 15 through which fluid can flow is thus relatively low leading to an increased velocity of resultant fluid flow through the outlet conduit 81 and outlet 6.

It is envisaged that any suitable liquid level sensing means could be used as the liquid level sender.

Having described the principles of my invention with reference to a number of desirable embodiments, it should be apparent to those of ordinary skill in the art that these embodiments may be modified in arrangement and detail without departing from such principles. I claim all such modifications that fall within the scope of the following claims.

The invention claimed is:

1. A particle separation assembly comprising a vessel, the vessel comprising an inlet for receiving fluid carrying particles, a first outlet below the inlet, a second outlet above the inlet, and a plurality of tubes extending from adjacent the inlet to adjacent the second outlet, the assembly being so arranged that when a fluid carrying particles is pumped through the inlet into the vessel and the flow rate of fluid through the inlet is greater than the flow rate of fluid through the first outlet, the difference between the flow rate of fluid through the inlet and the flow rate of fluid through the first outlet gives rise to a resultant upwardly directed fluid flow which acts to convey a substantial proportion of particles below a predetermined mass through one or more of the tubes to the second outlet, the particle separation assembly further comprising a flow rate adjuster operable to vary the cross sectional area of, selectively, one or more than one of the tubes in fluid communication with the second outlet, and adjust the velocity of the resultant fluid flow through the vessel.

2. The particle separation assembly of claim 1 wherein the vessel further comprises a housing within which the plurality of tubes are contained, and the plurality of tubes extend across a majority of the distance between the inlet and the second outlet within the housing of the vessel.

3. The particle separation assembly of claim 2 wherein the flow rate adjuster is positioned within the housing and is operable to close or partially close the tube or tubes.

4. The particle separation assembly of claim 3 wherein the flow rate adjuster is operative to close the tube or tubes by varying a level of liquid within the vessel to vary the number of tubes that are below the liquid level to thereby vary the number of tubes in fluid communication with the second outlet.

5. The particle separation assembly of claim 4 wherein the flow rate adjuster is operative to vary the liquid level within the tube or tubes by varying the air pressure in the vessel such that increasing the air pressure serves to reduce the liquid level to reduce the number of tubes that are below the liquid level and which are therefore in fluid communication with the second outlet.

6. The particle separation assembly of claim 1 wherein the plurality of tubes are arranged in a plurality of rows.

7. The particle separation assembly of claim 1 wherein one of said tubes nearest the second outlet is a different length than a second of said tubes distal from the second outlet.

8. The particle separation assembly of claim 7 wherein the one of said tubes nearest the second outlet is shorter than the second of said tubes distal from the second outlet.

9. The particle separation assembly of claim 8 wherein the tubes are arranged to be of incrementally increasing length with the tube or tubes distal from the second outlet being longer than the tube or tubes adjacent the second outlet.

10. The particle separation assembly of claim 1 wherein the flow rate adjuster comprises a plate movable between a first position in which the plate reduces the cross sectional area of a tube that is in fluid communication with the second outlet, and a second position in which the plate increases the cross sectional area of the tube that is not in fluid communication with the second outlet.

11. The particle separation assembly of claim 10 wherein the plate is movable between a first position in which the plate closes a tube such that that tube is not in fluid communication with the second outlet or partially closes the tube, and a second position in which the plate opens the tube.

12. The particle separation assembly of claim 11 wherein the plate is movable to at least one position intermediate the first and second positions.

13. The particle separation assembly of claim 12 wherein the plate is movable between a plurality of positions intermediate the first and second positions.

14. The particle separation assembly of claim 10 wherein the plate is movable to a position in which the plate sealingly closes an entire row of tubes.

15. The particle separation assembly of claim 10 comprising a lock operable to lock the plate in a desired position.

16. The particle separation assembly of claim 10 wherein the plate comprises a flap pivotally mounted on the vessel.

17. The particle separation assembly of claim 1 wherein the flow rate of the fluid carrying particles being pumped through the inlet into the vessel is greater that the flow rate of fluid exiting the vessel through the second outlet.

18. The particle separation assembly of claim 1 wherein the inlet of the vessel is the only fluid inlet of the vessel.

19. The particle separation assembly of claim 1 wherein the flow rate adjuster is operable to vary the cross-sectional area of one or more of the tubes by closing or partially closing said one or more tubes to fluid flow.

20. A particle separation assembly comprising a vessel, the vessel comprising a housing, an inlet for receiving fluid carrying particles, a first outlet below the inlet, a second outlet above the inlet, and a plurality of tubes contained within the housing, the tubes extending from adjacent the inlet to adjacent the second outlet, the assembly further comprising a source of fluid carrying particles coupled to the inlet, the assembly being so arranged that when a fluid carrying particles is pumped from the source, through the inlet, and into the vessel and the flow rate of fluid through the inlet is greater than the flow rate of fluid through the first outlet, the difference between the flow rate of fluid through the inlet and the flow rate of fluid through the first outlet gives rise to a resultant fluid flow which acts to convey a substantial proportion of particles below a predetermined mass through one or more of the tubes to the second outlet, the particle separation assembly further comprising a flow rate adjuster pivotally mounted to the vessel housing adjacent the second outlet and operable to adjust the velocity of the resultant fluid flow through the vessel.

21. A particle separation assembly comprising a vessel, the vessel comprising a housing, only one fluid inlet, a first outlet below the inlet, a second outlet above the inlet, and a plurality of tubes contained within the housing, the tubes extending across a majority of the distance between the inlet and the second outlet, the assembly being so arranged that when a fluid carrying particles is pumped through the inlet into the vessel and the flow rate of fluid through the inlet is greater than the flow rate of fluid through the first outlet, the difference between the flow rate of fluid through the inlet and the flow rate of fluid through the first outlet gives rise to a resultant upwardly directed fluid flow which acts to convey a substantial proportion of particles below a predetermined mass through one or more of the tubes to the second outlet, the particle separation assembly further comprising a flow rate adjuster positioned within the housing and operable to vary the cross sectional area of one or more of the tubes in fluid communication with the second outlet so as to adjust the velocity of the resultant fluid flow through the vessel, the flow rate adjuster also operable to close, selectively, one or more than one of the tubes so as to prevent the flow of fluid through the closed one or more tubes.

* * * * *